(12) United States Patent
Xia et al.

(10) Patent No.: US 7,728,570 B2
(45) Date of Patent: Jun. 1, 2010

(54) POWER FACTOR CORRECTION CIRCUIT AND POWER SUPPLY APPARATUS THEREOF

(75) Inventors: Chun-Hua Xia, Shanghai (CN); Shih-Hao Liu, Taipei (TW)

(73) Assignee: Inventec Corporation, Taipei (TW)

( * ) Notice: Subject to any disclaimer, the term of this patent is extended or adjusted under 35 U.S.C. 154(b) by 264 days.

(21) Appl. No.: 12/110,892

(22) Filed: Apr. 28, 2008

(65) Prior Publication Data

US 2009/0230937 A1 Sep. 17, 2009

(30) Foreign Application Priority Data

Mar. 12, 2008 (TW) .............................. 97108698 A

(51) Int. Cl.
*G05F 1/70* (2006.01)
*G05F 1/614* (2006.01)
(52) U.S. Cl. ........................ 323/282; 323/284; 323/285; 323/288
(58) Field of Classification Search ................. 323/282, 323/284, 285, 288, 222, 224
See application file for complete search history.

(56) References Cited

U.S. PATENT DOCUMENTS

| | | | | |
|---|---|---|---|---|
| 6,034,513 A | * | 3/2000 | Farrington et al. | 323/222 |
| 6,232,755 B1 | * | 5/2001 | Zhang | 323/282 |
| 6,388,429 B1 | * | 5/2002 | Mao | 323/222 |
| 7,012,413 B1 | * | 3/2006 | Ye | 323/284 |
| 7,595,623 B2 | * | 9/2009 | Bennett | 323/288 |
| 2006/0176029 A1 | * | 8/2006 | McGinty et al. | 323/222 |
| 2008/0136395 A1 | * | 6/2008 | Bennett | 323/288 |

* cited by examiner

*Primary Examiner*—Bao Q Vu
(74) *Attorney, Agent, or Firm*—J.C. Patents

(57) ABSTRACT

A power factor correction circuit including a boost converter, a first capacitor, a first resistor, and a boost control unit is provided. The boost control unit includes a signal generator and a frequency controller. The boost converter transforms a rectified voltage to a correction voltage according to a pulse width modulation (PWM) signal. The first capacitor and the first resistor are coupled between an input terminal and a ground terminal of the boost converter. The boost control unit is adapted to generate the PWM signal, and adjust a duty cycle and a frequency of the PWM signal according to a current flowing through the first resistance, the rectified voltage and the correction voltage. Wherein, the signal generator is adapted to generate a ramp signal and adjust a slope of the ramp signal according to a charging current. The frequency controller adjusts the charging current according to the rectified voltage.

16 Claims, 2 Drawing Sheets

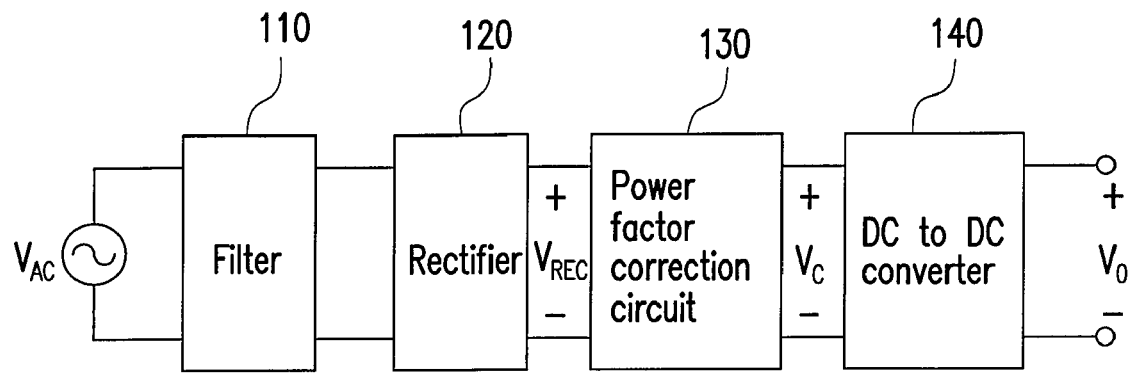
FIG. 1
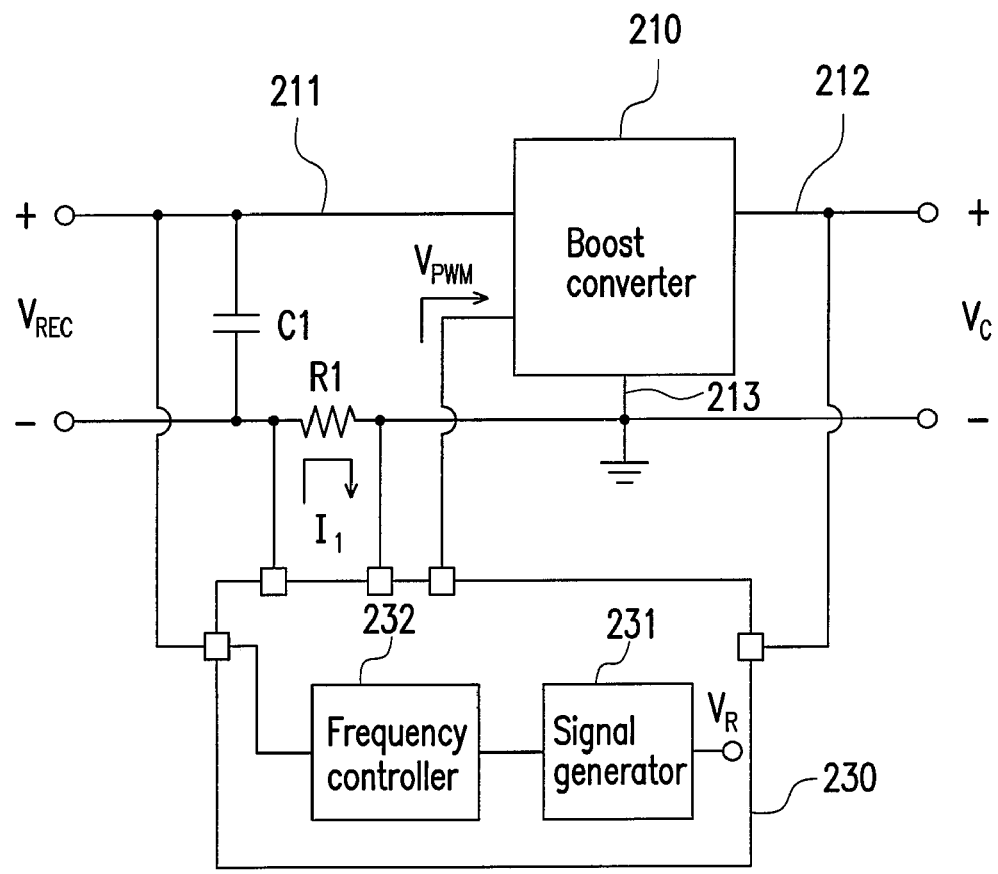

US 7,728,570 B2

POWER FACTOR CORRECTION CIRCUIT AND POWER SUPPLY APPARATUS THEREOF

CROSS-REFERENCE TO RELATED APPLICATION

This application claims the priority benefit of Taiwan application serial no. 97108698, filed on Mar. 12, 2008. The entirety of the above-mentioned patent application is hereby incorporated by reference herein and made a part of specification.

BACKGROUND OF THE INVENTION

1. Field of the Invention

The present invention relates to a power factor correction circuit and a power supply apparatus thereof. More particularly, the present invention relates to a power factor correction circuit and a power supply apparatus thereof, which may reduce an electromagnetic interference (EMI).

2. Description of Related Art

In evaluation criteria for various electronic apparatuses, electromagnetic compatibility (EMC) thereof is an essential quality indicator. Evaluation of the EMC includes electromagnetic interference (EMI) and electromagnetic susceptibility (EMS). Since signal transmission speed of a present electronic apparatus is increasingly fast, the EMI caused by electronic components within the electronic apparatus becomes more and more serious, so that normal operations of other electronic components within the electronic apparatus are influenced.

Generally, the EMI is mainly transmitted into a circuit via a power supply. Therefore, in a server, to match with some corresponding standards, an EMI test is also a key test for the power supply. Moreover, the present power supply generally has at least one switch device, and voltages to be output may be generated by turning on/off the switch device.

However, with repeated switching of the switch device, the EMI caused by the power supply is increased. Though the present power supply may constantly adjust a frequency of an internal pulse width modulation (PWM) signal thereof to mitigate the EMI, how to adjust the frequency of the PWM signal while maintaining a stable power output is still an issue under development.

SUMMARY OF THE INVENTION

The present invention is directed to a power factor correction circuit, which may adjust a frequency of a pulse width modulation (PWM) signal for reducing an electromagnetic interference (EMI) phenomenon.

The present invention is directed to a power supply apparatus, which may adjust a frequency of an internal PWM signal thereof of reducing an EMI phenomenon.

The present invention provides a power factor correction circuit including a boost converter, a first capacitor, a first resistor, and a boost control unit. The boost converter has an input terminal, an output terminal and a ground terminal, and is used for transforming a rectified voltage transmitted via the input terminal to a correction voltage transmitted via the output terminal according to a PWM signal. A first terminal of the first capacitor is coupled to the input terminal, and a first terminal of the resistor is coupled to a second terminal of the first capacitor, and a second terminal of the resistor is coupled to the ground terminal. The boost control unit is coupled to the first terminal and the second terminal of the first resistor, and coupled to the input terminal and the output terminal, and the boost control unit generates the PWM signal based on a ramp signal, and adjusts a duty cycle and a frequency of the PWM signal according to a current flowing through the first resistor, the rectified voltage and the correction voltage.

Moreover, the boost control unit includes a signal generator and a frequency controller. The signal generator is adapted to generate the ramp signal and adjust a slope of the ramp signal according to a charging current. The frequency controller is coupled to the signal generator and the input terminal, and is used for adjusting the charging current according to the rectified voltage.

In an embodiment of the present invention, the boost converter includes an inductor, a first transistor, a diode and a second capacitor. A first terminal of the inductor is coupled to the input terminal of the boost converter. A gate of the first transistor receives the PWM signal, a drain thereof is coupled to a second terminal of the inductor, and a source thereof is coupled to the ground terminal of the boost converter. An anode of the diode is coupled to the drain of the first transistor, and a cathode thereof is coupled to the output terminal of the boost converter. A first terminal of the second capacitor is coupled to the cathode of the diode, and a second terminal thereof is coupled to the ground terminal of the boost converter. Moreover, the first transistor is an NMOS transistor.

In an embodiment of the present invention, the signal generator includes a second resistor, a second transistor, a third transistor, a third capacitor, a fourth transistor and a comparator. A first terminal of the second resistor receives the charging current, and a second terminal thereof is coupled to a ground. An emitter of the second transistor receives a first voltage, and a base and a collector thereof are coupled to the first terminal of the second resistor. An emitter of the third transistor is coupled to the emitter of the second transistor, and a base thereof is coupled to a base of the fourth transistor. A first terminal of the third capacitor is coupled to a collector of the third transistor, and a second terminal thereof is coupled to the ground. A drain of the fourth transistor is coupled to the collector of the third transistor, and a source thereof is coupled to the ground. A first input terminal of the comparator is coupled to the drain of the fourth transistor, a second input terminal thereof receives a second voltage, and an output terminal thereof is coupled to a gate of the fourth transistor.

In an embodiment of the present invention, the second transistor and the third transistor are PNP bipolar junction transistors (BJTs). Moreover, the fourth transistor is an NMOS transistor.

In an embodiment of the present invention, the frequency controller includes a third resistor, a fifth transistor, a fourth resistor, a fifth resistor, a sixth resistor, a seventh resistor, an eighth resistor, a fourth capacitor, a sixth transistor, a ninth resistor, a tenth resistor, an eleventh resistor, a fifth capacitor and a twelfth resistor. A first terminal of the third resistor is coupled to the signal generator, and a second terminal thereof is coupled to a ground. A collector of the fifth transistor is coupled to the first terminal of the third resistor. A first terminal of the fourth resistor is coupled to an emitter of the fifth transistor, and a second terminal thereof is coupled to the ground. A first terminal of the fifth resistor receives the rectified voltage. A first terminal of the sixth resistor is coupled to a second terminal of the fifth resistor.

Moreover, a first terminal of the seventh resistor is coupled to a second terminal of the sixth resistor, and a second terminal thereof is coupled to a base of the fifth transistor. A first terminal of the eighth resistor is coupled to the second terminal of the seventh resistor, and a second terminal thereof is coupled to the ground. A first terminal of the fourth capacitor is coupled to the first terminal of the eighth resistor, and a second terminal thereof is coupled to the ground. A collector of the sixth transistor is coupled to the first terminal of the fourth capacitor. A first terminal of the ninth resistor is coupled to an emitter of the sixth transistor, and a second terminal thereof is coupled to the ground. A first terminal of the tenth resistor receives a direct current (DC) voltage is proportional to the rectified voltage, and a second terminal thereof is coupled to a base of the sixth transistor. A first terminal of the eleventh resistor is coupled to the second terminal of the tenth resistor, and a second terminal thereof is coupled to the ground. A first terminal of the fifth capacitor is coupled to the first terminal of the tenth resistor, and a second terminal thereof is coupled to the ground. A first terminal of the twelfth resistor is coupled to the first terminal of the fifth capacitor, and a second terminal thereof is coupled to the ground.

In an embodiment of the present invention, the fifth transistor and the sixth transistor are NPN BJTs. Moreover, a resistance of the ninth resistor is less than that of the eighth resistor.

The present invention provides a power supply apparatus including a filter, a rectifier, a power factor correction circuit and a DC to DC converter. The filter is used for receiving an AC voltage and filtering a high frequency portion of the AC voltage. The rectifier is coupled to the filter, and is used for rectifying the filtered AC voltage to generate a rectified voltage. The power factor correction circuit is coupled to the filter, and is used for transforming the rectified voltage to a correction voltage according to a PWM signal, wherein the power factor correction circuit includes a boost converter, a first capacitor, a first resistor and a boost control unit.

The boost converter has an input terminal, an output terminal and a ground terminal, and is used for transforming the rectified voltage transmitted via the input terminal to the correction voltage transmitted via the output terminal according to the PWM signal. A first terminal of the first capacitor is coupled to the input terminal. A first terminal of the resistor is coupled to a second terminal of the first capacitor, and a second terminal of the resistor is coupled to the ground terminal. The boost control unit is coupled to the first terminal and the second terminal of the first resistor, and coupled to the input terminal and the output terminal, and the boost control unit generates the PWM signal based on a ramp signal, and adjusts a duty cycle and a frequency of the PWM signal according to a current flowing through the first resistor, the rectified voltage and the correction voltage.

Moreover, the boost control unit includes a signal generator and a frequency controller. The signal generator is adapted to generate the ramp signal and adjust a slope of the ramp signal according to a charging current. The frequency controller is coupled to the signal generator and the input terminal, and is used for adjusting the charging current according to the rectified voltage. The DC to DC converter is coupled to the power factor correction circuit, and is used for transforming the correction voltage to an output voltage.

In the present invention, by controlling the charging current via the frequency controller, the signal generator may correspondingly adjust the slope of the ramp signal. Since the slope of the ramp signal is changed, the frequency of the PWM signal is then adjusted, so that the EMI caused by the power supply apparatus may be reduced. Moreover, the power supply apparatus of the present invention may still provide a stable voltage outputting while adjusting the PWM signal.

In order to make the aforementioned and other objects, features and advantages of the present invention comprehensible, a preferred embodiment accompanied with figures is described in detail below.

BRIEF DESCRIPTION OF THE DRAWINGS

FIG. 1 is a block diagram illustrating a power supply apparatus according to an embodiment of the present invention.

FIG. 2 is a circuit block diagram illustrating a power factor correction circuit of FIG. 1.

DESCRIPTION OF EMBODIMENTS

Figure 3:
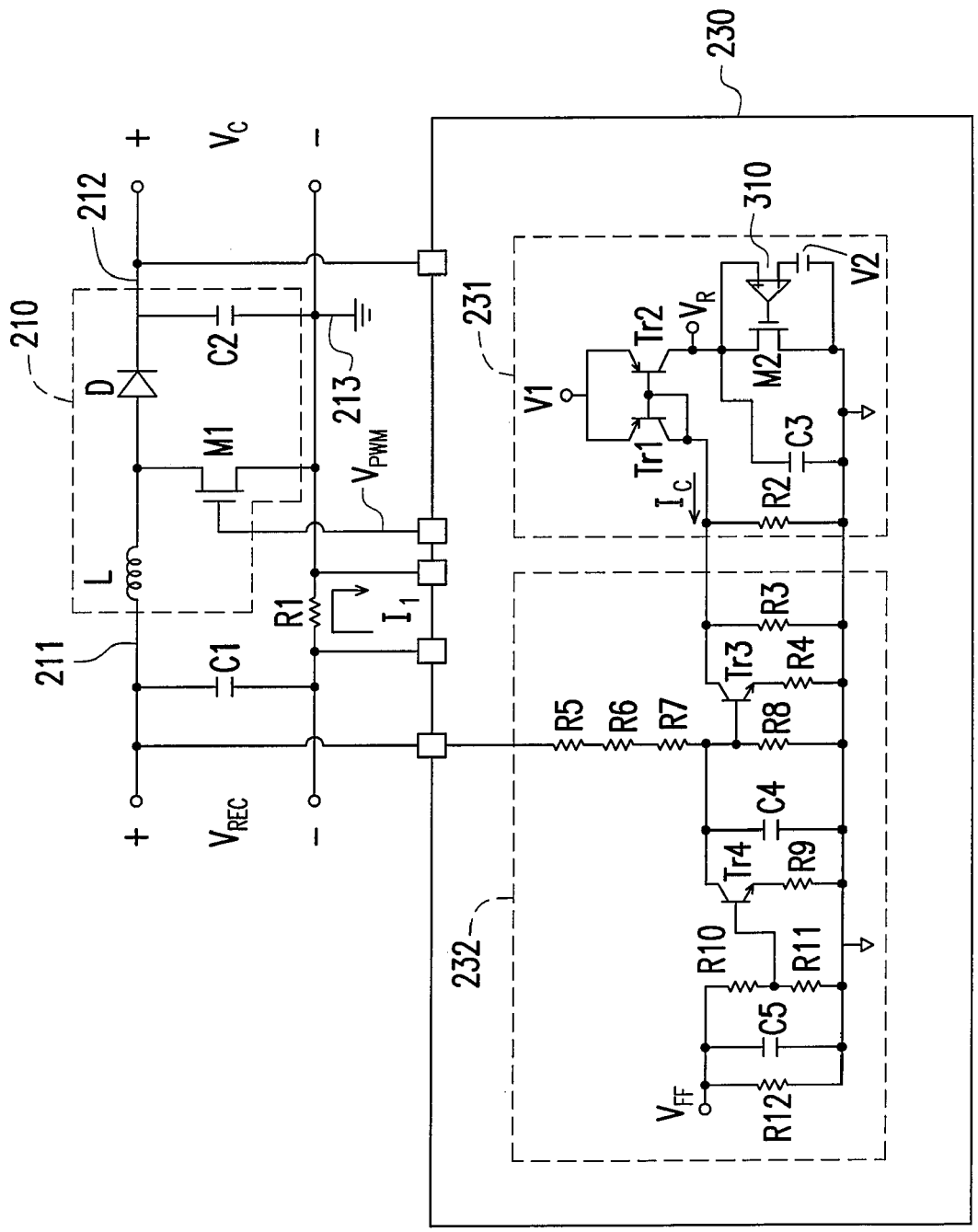
FIG. 3 is a detailed circuit diagram illustrating a power factor correction circuit of FIG. 2.

In the following content, to present a persistent description to the present invention, in different drawings, components with similar functions and structures are represented by the same component symbol and reference numeral.

FIG. 1 is a block diagram illustrating a power supply apparatus according to an embodiment of the present invention. Referring to FIG. 1, the power supply apparatus 100 includes a filter 110, a rectifier 120, a power factor correction circuit 130 and a DC to DC converter 140.

The filter 110 receives an AC voltage $V_{AC}$, and filters a high frequency portion of the AC voltage $V_{AC}$. The rectifier 120 is coupled to the filter 110, and rectifies the filtered AC voltage $V_{AC}$ for generating a rectified voltage $V_{REC}$. In the present embodiment, the rectifier 120 may be embodied by a bridge rectifier.

The power factor correction circuit 130 is coupled to the rectifier 120. Generally, the power factor correction circuit 130 may adjust a waveform of an input current, so that a phase difference between the input current and the rectified voltage $V_{REC}$ is closed to 0. By such means, the power supply apparatus 100 then may reduce power consumption thereof via the power factor correction circuit 130.

The DC to DC converter 140 is coupled to the power factor correction circuit 130, and transforms a correction voltage $V_C$ to generate an output voltage $V_O$ to be provided by the power supply apparatus 100.

It should be noted that in the present embodiment, the power factor correction circuit 130 may reduce the EMI phenomenon. To fully convey the spirit of the present invention to those skilled in the art, the power factor correction circuit 130 is described in detail below.

FIG. 2 is a circuit block diagram illustrating the power factor correction circuit 130 of FIG. 1. Referring to FIG. 2, the power factor correction circuit 130 includes a boost converter 210, a capacitor C1, a resistor R1 and a boost control unit 230. Wherein, the boost converter 210 has an input terminal 211, an output terminal 212 and a ground terminal 213. The boost converter 210 is used for transforming the rectified voltage $V_{REC}$ transmitted via the input terminal 211 to a correction voltage $V_C$ transmitted via the output terminal 212 according to a PWM signal $V_{PWM}$. A first terminal of the capacitor C1 is coupled to the input terminal 211, and a first terminal of the resistor R1 is coupled to a second terminal of the capacitor C1, and a second terminal of the resistor R1 is coupled to the ground terminal 213. The ground terminal 213 of the boost converter 210 is coupled to a ground.

The boost control unit 230 is coupled to the first terminal and the second terminal of the resistor R1, and coupled to the input terminal 211 and the output terminal 212. The boost control unit 230 generates the PWM signal $V_{PWM}$ based on a ramp signal $V_R$, and adjusts a duty cycle and a frequency of the PWM signal $V_{PWM}$ according to a current $I_1$ flowing through the resistor R1, the rectified voltage $V_{REC}$ and the correction voltage $V_C$.

In the present embodiment, the boost control unit 230 includes a signal generator 231 and a frequency controller 232. The signal generator 231 generates the ramp signal $V_R$, and adjusts a slope of the ramp signal $V_R$ according to a charging signal $I_C$. The frequency controller 232 is coupled to the signal generator 231 and the input terminal 211, and is used for adjusting the charging current $I_C$ according to the rectified voltage $V_{REC}$.

It should be noted that the power factor correction circuit 130 adjusts the charging current $I_C$ via the frequency controller 232. Next, the signal generator 231 adjusts a frequency of the ramp signal $V_R$ based on a variation of the current value of the charging current $I_C$, so that the boost control unit 230 may correspondingly adjust the frequency of the PWM signal $V_{PWM}$ for reducing the EMI phenomenon.

In the following, a circuit diagram of the power factor correction circuit 130 is provided to illustrate the operation of the power factor correction circuit 130 to adjust the charging current $I_C$ and the slope of the ramp signal $V_R$.

FIG. 3 is a detailed circuit diagram illustrating the power factor correction circuit 130 of FIG. 2. Referring to FIG. 3, the boost converter 210 includes an inductor L, a transistor M1, a diode D and a capacitor C2. A first terminal of the inductor L is coupled to the input terminal 211 of the boost converter 210. A gate of the transistor M1 receives the PWM signal $V_{PWM}$, a drain of the transistor M1 is coupled to a second terminal of the inductor L, and a source of the transistor M1 is coupled to the ground terminal 213 of the boost converter 210. An anode of the diode D is coupled to the drain of the transistor M1, a cathode of the diode D is coupled to the output terminal 212 of the boost converter 210. A first terminal of the capacitor C2 is coupled to the cathode of the diode D, and a second terminal of the capacitor C2 is coupled to the ground terminal 213 of the boost converter 210. In the present embodiment, the transistor M1 may be an NMOS transistor.

The signal generator 231 includes a resistor R2, transistors Tr1 and Tr2, a transistor M2, a capacitor C3 and a comparator 310. A first terminal of the resistor R2 receives the charging current $I_C$, and a second terminal thereof is coupled to a ground. An emitter of the transistor Tr1 receives a first voltage V1, and a base and a collector of the transistor Tr1 are coupled to the first terminal of the resistor R2. An emitter of the transistor Tr2 is coupled to the emitter of the transistor Tr1, and a base of the transistor Tr2 is coupled to the base of the transistor Tr1.

Moreover, a first terminal of the capacitor C3 is coupled to a collector of the transistor Tr2, and a second terminal thereof is coupled to the ground. A drain of the transistor M2 is coupled to the collector of the transistor Tr2, and a source of the transistor M2 is coupled to the ground. A first input terminal of the comparator 310 is coupled to the drain of the transistor M2, a second input terminal of the comparator 310 receives a second voltage V2, and an output terminal of the comparator 310 is coupled to a gate of the transistor M2. In the present embodiment, the transistors Tr1 and Tr2 may be PNP bipolar junction transistors (BJTs), and the transistor M2 may be the NMOS transistor.

Referring to FIG. 3 again, the frequency controller 232 includes resistors R3~R12, transistors Tr3 and Tr4, and capacitors C4 and C5. A first terminal of the resistor R3 is coupled to the signal generator 231, and a second terminal thereof is coupled to the ground. A Collector of the transistor Tr3 is coupled to the first terminal of the resistor R3. A first terminal of the resistor R4 is coupled to an emitter of the transistor Tr3, and a second terminal thereof is coupled to the ground. A first terminal of the resistor R5 receives the rectified voltage $V_{REC}$. A first terminal of the resistor R6 is coupled to a second terminal of the resistor R5. A first terminal of the resistor R7 is coupled to a second terminal of the resistor R6, and a second terminal thereof is coupled to a base of the transistor Tr3.

Moreover, a first terminal of the resistor R8 is coupled to the second terminal of the resistor R7, and a second terminal thereof is coupled to the ground. A first terminal of the capacitor C4 is coupled to the first terminal of the resistor R8, and a second terminal thereof is coupled to the ground. A collector of the transistor Tr4 is coupled to the first terminal of the capacitor C4. A first terminal of the resistor R9 is coupled to an emitter of the transistor Tr4, and a second terminal thereof is coupled to the ground. A first terminal of the resistor R10 receives a DC voltage $V_{FF}$ proportional to the rectified voltage $V_{REC}$, and a second terminal thereof is coupled to a base of the transistor Tr4.

Moreover, a first terminal of the resistor R11 is coupled to the second terminal of the resistor R10, and a second terminal thereof is coupled to the ground. A first terminal of the capacitor C5 is coupled to the first terminal of the resistor R10, and a second terminal thereof is coupled to the ground. A first terminal of the resistor R12 is coupled to the first terminal of the capacitor C5, and a second terminal thereof is coupled to the ground. In the present invention, the transistors Tr3 and Tr4 may be NPN BJTs.

Hereinafter, the operation of the power factor correction circuit is described. First, when the transistor Tr3 of the frequency controller 232 is still not turned on, the charging current $I_C$ is a summation of currents flowing through the resistors R2 and R3. Since the transistors Tr1 and Tr2 may form a current mirror, the current output from the collector of the transistor Tr2 is the same to the charging current $I_C$. Next, the comparator 310 controls a turning on/off state of the transistor M2 for charging or discharging the capacitor C3. With repeat charging and discharging of the capacitor C3, the signal generator 231 then generates the ramp signal $V_R$.

When the transistor Tr3 is turned on, the charging current $I_C$ is then a summation of currents flowing through the resistors R2, R3 and R4. Therefore, the current value of the charging current $I_C$ is changed. Since the charging current $I_C$ is changed, the signal controller 231 then adjusts the slope of the ramp signal $V_R$. Accordingly, the boost control unit 230 also correspondingly adjusts the frequency of the PWM signal $V_{PWM}$, so as to reduce the EMI phenomenon of the power supply apparatus 100.

In the present embodiment, the frequency controller 232 may determines a turning on/off state of the transistor Tr3 according to the rectified voltage $V_{REC}$. For example, since whether or not the transistor Tr3 is turned on/off is determined based on a voltage received by the base thereof, i.e. a voltage difference between two ends of the resistor R8. The voltage of the resistor R8 is obtained by dividing the received rectified voltage $V_{REC}$ of the frequency controller 232 via the resistors R5~R8. Therefore, the frequency controller 232 may determine the turning on/off state of the transistor Tr3 according to the rectified voltage $V_{REC}$. The capacitor C4 is used for filtering a high frequency noise.

Moreover, the turning on/off state of the transistor Tr4 may also determine the turning on/off state of the transistor Tr3. For example, when the transistor Tr4 is turned off, the voltage received by the base of the transistor Tr3 is then the voltage difference between two ends of the resistor R8. When the transistor Tr4 is turned on, the voltage received by the base of the transistor Tr3 is then a voltage difference between two ends of resistors R8 and R9 connected in parallel. Consequently, the turning on/off state of the transistor Tr3 is then determined based on the voltage received from the base thereof.

Moreover, the frequency controller 232 may determine the turning on/off state of the transistor Tr4 according to the DC voltage $V_{FF}$. For example, the DC voltage $V_{FF}$ is filtered via a filter formed by the resistor R12 and the capacitor C5. Next, the filtered DC voltage $V_{FF}$ is divided by the resistors R10 and R11, so as to generate the voltage for the base of the transistor Tr4, i.e. the voltage difference between two ends of the resistor R11. Therefore, the DC voltage $V_{FF}$ may control any current variation caused by the rectified voltage $V_{REC}$, so as to ensure the frequency of the PWM signal $V_{PWM}$ may be varied as a function of the rectified current $V_{REC}$.

In the present embodiment, the frequency of the PWM signal $V_{PWM}$ provided by the boost control unit 230 may be varied by 20%. Moreover, to maintain a minimum inductance and a minimum depletion, frequency variation of the power factor correction circuit 130 cannot exceed 20%~30% of a base frequency. Moreover, a duty cycle of the power factor correction circuit 130 may be varied from 80% to 100%.

In summary, in the present invention, by controlling the charging current via the frequency controller, the signal generator may correspondingly adjust the slope of the ramp signal. Since the slope of the ramp signal is changed, the frequency of the PWM signal is then adjusted, so that the EMI caused by the power supply apparatus may be reduced. Moreover, the power supply apparatus of the present invention may still provide a stable voltage outputting while adjusting the PWM signal.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A power factor correction circuit, comprising:
   a boost converter, having an input terminal, an output terminal and a ground terminal, for transforming a rectified voltage transmitted via the input terminal to a correction voltage transmitted via the output terminal according to a pulse width modulation (PWM) signal;
   a first capacitor, having a first terminal coupled to the input terminal;
   a first resistor, having a first terminal coupled to a second terminal of the first capacitor, and a second terminal coupled to the ground terminal; and
   a boost control unit, coupled to the first terminal and the second terminal of the first resistor, and coupled to the input terminal and the output terminal, wherein the boost control unit generates the PWM signal based on a ramp signal, and adjusts a duty cycle and a frequency of the PWM signal according to a current flowing through the first resistor, the rectified voltage and the correction voltage, wherein the boost control unit comprises:
      a signal generator, for generating the ramp signal, and adjusting a slope of the ramp signal according to a charging current; and
      a frequency controller, coupled to the signal generator and the input terminal, for adjusting the charging current according to the rectified voltage.

2. The power factor correction circuit as claimed in claim 1, wherein the boost converter comprises:
   an inductor, having a first terminal coupled to the input terminal of the boost converter;
   a first transistor, having a gate receiving the PWM signal, a drain coupled to a second terminal of the inductor, and a source coupled to the ground terminal of the boost converter;
   a diode, having an anode coupled to the drain of the first transistor, and a cathode coupled to the output terminal of the boost converter; and
   a second capacitor, having a first terminal coupled to the cathode of the diode, and a second terminal coupled to the ground terminal of the boost converter.

3. The power factor correction circuit as claimed in claim 2, wherein the first transistor is an NMOS transistor.

4. The power factor correction circuit as claimed in claim 1, wherein the signal generator comprises:
   a second resistor, having a first terminal receiving the charging current, and a second terminal coupled to a ground;
   a second transistor, having an emitter receiving a first voltage, a base and a collector coupled to the first terminal of the second resistor;
   a third transistor, having an emitter coupled to the emitter of the second transistor, and a base coupled to the base of the second transistor;
   a third capacitor, having a first terminal coupled to a collector of the third transistor, and a second terminal coupled to the ground;
   a fourth transistor, having a drain coupled to the collector of the third transistor, and a source coupled to the ground; and
   a comparator, having a first input terminal coupled to the drain of the fourth transistor, a second input terminal receiving a second voltage, and an output terminal coupled to a gate of the fourth transistor.

5. The power factor correction circuit as claimed in claim 4, wherein the second transistor and the third transistor are PNP BJTs.

6. The power factor correction circuit as claimed in claim 4, wherein the fourth transistor is an NMOS transistor.

7. The power factor correction circuit as claimed in claim 1, wherein the frequency controller comprises:
   a third resistor, having a first terminal coupled to the signal generator, and a second terminal coupled to a ground;
   a fifth transistor, having a collector coupled to the first terminal of the third resistor;
   a fourth resistor, having a first terminal coupled to an emitter of the fifth transistor, and a second terminal coupled to the ground;
   a fifth resistor, having a first terminal receiving the rectified voltage;
   a sixth resistor, having a first terminal coupled to a second terminal of the fifth resistor;
   a seventh resistor, having a first terminal coupled to a second terminal of the sixth resistor, and a second terminal coupled to a base of the fifth transistor;
   an eighth resistor, having a first terminal coupled to the second terminal of the seventh resistor, and a second terminal coupled to the ground;
   a fourth capacitor, having a first terminal coupled to the first terminal of the eighth resistor, and a second terminal coupled to the ground;
   a sixth transistor, having a collector coupled to the first terminal of the fourth capacitor;
   a ninth resistor, having a first terminal coupled to an emitter of the sixth transistor, and a second terminal coupled to the ground;
   a tenth resistor, having a first terminal receiving a DC voltage proportional to the rectified voltage, a second terminal coupled to a base of the sixth transistor;

an eleventh resistor, having a first terminal coupled to the second terminal of the tenth resistor, and a second terminal coupled to the ground;

a fifth capacitor, having a first terminal coupled to the first terminal of the tenth resistor, and a second terminal coupled to the ground; and a twelfth resistor, having a first terminal coupled to the first terminal of the fifth capacitor, and a second terminal coupled to the ground.

8. The power factor correction circuit as claimed in claim 7, wherein the fifth transistor and the sixth transistor are NPN BJTs.

9. A power supply apparatus, comprising:

a filter, for receiving an AC voltage, and filtering a high frequency portion of the AC voltage;

a rectifier, coupled to the filter, for rectifying the filtered AC voltage to generate a rectified voltage;

a power factor correction circuit, coupled to the filter, comprising:

a boost converter, having an input terminal, an output terminal and a ground terminal, for transforming the rectified voltage transmitted via the input terminal to the correction voltage transmitted via the output terminal according to a PWM signal;

a first capacitor, having a first terminal coupled to the input terminal;

a first resistor, having a first terminal coupled to a second terminal of the first capacitor, and a second terminal coupled to the ground terminal; and a boost control unit, coupled to the first terminal and the second terminal of the fist resistor, and coupled to the input terminal and the output terminal, wherein the boost control unit generates the PWM signal based on a ramp signal, and adjusts a duty cycle and a frequency of the PWM signal according to a current flowing through the first resistor, the rectified voltage and the correction voltage, wherein the boost control unit comprises:

a signal generator, for generating the ramp signal, and adjusting a slope of the ramp signal according to a charging current; and a frequency controller, coupled to the signal generator and the input terminal, for adjusting the charging current according to the rectified voltage; and a DC to DC converter, coupled to the power factor correction circuit, for transforming the correction voltage to an output voltage.

10. The power supply apparatus as claimed in claim 9, wherein the boost converter comprises:

an inductor, having a first terminal coupled to the input terminal of the boost converter;

a first transistor, having a gate receiving the PWM signal, a drain coupled to a second terminal of the inductor, and a source coupled to the ground terminal of the boost converter;

a diode, having an anode coupled to the drain of the first transistor, and a cathode coupled to the output terminal of the boost converter; and a second capacitor, having a first terminal coupled to the cathode of the diode, and a second terminal coupled to the ground terminal of the boost converter.

11. The power supply apparatus as claimed in claim 10, wherein the first transistor is an NMOS transistor.

12. The power supply apparatus as claimed in claim 9, wherein the signal generator comprises:

a second resistor, having a first terminal receiving the charging current, and a second terminal coupled to a ground;

a second transistor, having an emitter receiving a first voltage, a base and a collector coupled to the first terminal of the second resistor;

a third transistor, having an emitter coupled to the emitter of the second transistor, and a base coupled to the base of the second transistor;

a third capacitor, having a first terminal coupled to a collector of the third transistor, and a second terminal coupled to the ground;

a fourth transistor, having a drain coupled to the collector of the third transistor, and a source coupled to the ground; and a comparator, having a first input terminal coupled to the drain of the fourth transistor, a second input terminal receiving a second voltage, and an output terminal coupled to a gate of the fourth transistor.

13. The power supply apparatus as claimed in claim 12, wherein the second transistor and the third transistor are PNP BJTs.

14. The power supply apparatus as claimed in claim 12, wherein the fourth transistor is an NMOS transistor.

15. The power supply apparatus as claimed in claim 9, wherein the frequency controller comprises:

a third resistor, having a first terminal coupled to the signal generator, and a second terminal coupled to a ground;

a fifth transistor, having a collector coupled to the first terminal of the third resistor;

a fourth resistor, having a first terminal coupled to an emitter of the fifth transistor, and a second terminal coupled to the ground;

a fifth resistor, having a first terminal receiving the rectified voltage;

a sixth resistor, having a first terminal coupled to a second terminal of the fifth resistor;

a seventh resistor, having a first terminal coupled to a second terminal of the sixth resistor, and a second terminal coupled to a base of the fifth transistor;

an eighth resistor, having a first terminal coupled to the second terminal of the seventh resistor, and a second terminal coupled to the ground;

a fourth capacitor, having a first terminal coupled to the first terminal of the eighth resistor, and a second terminal coupled to the ground;

a sixth transistor, having a collector coupled to the first terminal of the fourth capacitor;

a ninth resistor, having a first terminal coupled to an emitter of the sixth transistor, and a second terminal coupled to the ground;

a tenth resistor, having a first terminal receiving a DC voltage proportional to the rectified voltage, a second terminal coupled to a base of the sixth transistor;

an eleventh resistor, having a first terminal coupled to the second terminal of the tenth resistor, and a second terminal coupled to the ground;

a fifth capacitor, having a first terminal coupled to the first terminal of the tenth resistor, and a second terminal coupled to the ground; and a twelfth resistor, having a first terminal coupled to the first terminal of the fifth capacitor, and a second terminal coupled to the ground.

16. The power supply apparatus as claimed in claim 15, wherein the fifth transistor and the sixth transistor are NPN BJTs.

* * * * *